United States Patent

[11] 3,622,321

| [72] | Inventors | Georges Joseph Smets<br>Heverlee;<br>Frans Carolus De Schurijver, Leuven, both of Belgium |
|---|---|---|
| [21] | Appl. No. | 875,571 |
| [22] | Filed | Nov. 10, 1969 |
| [45] | Patented | Nov. 23, 1971 |
| [73] | Assignee | Gevaert-Agfa N.V.<br>Mortsel, Belgium |
| [32] | Priority | Dec. 24, 1968 |
| [33] | | Great Britain |
| [31] | | 61,434/68 |

[54] PHOTODIMERIZATION AND PHOTOPOLYMERIZATION OF BIS-MALEIMIDES
8 Claims, No Drawings

[52] U.S. Cl..................................... 96/35.1,
96/115 R, 96/115 P, 204/159.22
[51] Int. Cl........................................ G03c 1/70
[50] Field of Search............................ 96/35.1,
115 P, 115; 204/159.22, 159.23

[56] References Cited
UNITED STATES PATENTS
3,201,240  8/1965  Faber........................... 96/115 X
3,372,169  3/1968  Fager........................... 204/159.22 X FOREIGN PATENTS
1,526,496  4/1968  France........................ 96/115

*Primary Examiner*—Ronald H. Smith
*Attorney*—Alfred W. Breiner

ABSTRACT: A photographic element comprising a support having a coating comprising a polymer of styrene and a bis-maleimide of the formula:

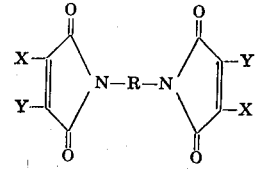

wherein:
R represents an alkylene group comprising one to 12 carbon atoms, a $-CH_2-Z-CH_2-$ group or an arylene group, Z being O, S or NH, and X and Y represent hydrogen, chlorine, or methyl, and the process of making the photographic element is described.

PHOTODIMERIZATION AND PHOTOPOLYMERIZATION OF BIS-MALEIMIDES

The invention relates to the photocyclomerisation of bis-maleimides and to photographic etching resists prepared thereby.

It is known that dienophiles such as derivatives of maleic anhydride can be condensed to cyclobutane derivatives by photosensitized cycloaddition (Ber. 95, 1642 (1962) ). It has also been described that the ultraviolet irradiation of solutions of maleic anhydride in benzene produces a crystalline 2:1 adduct (J.Chem.Soc. (1960) 4791 and J.Am.Chem.Soc. 83, 1705 (1961)).

It has now been found that certain bis-maleimides can be photocyclomerised to give intra- and extramolecular cyclomers, whereby the intramolecular cyclomers are merely formed by a ring-closure reaction in the same bis-maleimide compound, whereas extramolecular cyclomers are polymeric materials formed by a polyaddition reaction of the bis-maleimide. For facility's sake the intramolecular cyclomers will be named "cyclomers" hereinafter, whereas the extramolecular cyclomers, which actually are polymeric materials, will be named "cyclopolymers."

According to the invention a process is provided for the photocyclomerization of bis-maleimides, which comprises exposing to radiation in the range of 3,000 to 4,000 A a bis-maleimide of the general formula:

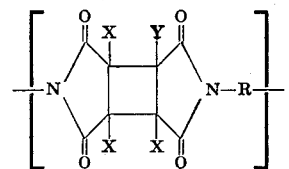

wherein:
R represents an alkylene group comprising one to 12 carbon atoms a —CH$_2$—Z—CH$_2$— group or an arylene group, Z being O, S or NH— and X and Y (same or different) represent hydrogen atoms, chlorine atoms, or methyl groups.

Depending on the —R-group linking the two maleimide groups and depending also on the X- and Y-substituents of these maleimide groups, cyclomers, cyclopolymers, or mixtures of both are obtained. For example, when both X and Y are hydrogen atoms and the R-group is —(CH$_2$)$_n$— wherein n=2, cyclomers are obtained that correspond to the following structural formula:

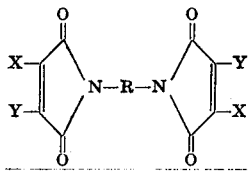

With growing value of n there is obtained a decreasing amount of cyclomer and an increasing amount of cyclopolymer, that is formed of a cyclobutane-containing recurring units of the formula:

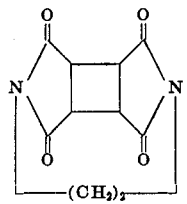

For n=7 the product obtained on exposure to actinic light comprises about 10 percent of cyclomer. Anyway, when n>7 the product formed is wholly composed of cyclopolymeric material.

The same pattern of reaction products is also found when the X and Y substituents are taken from chlorine atoms or methyl groups. In this case the cyclopolymers formed are composed of cyclobutane-containing recurring units of the formula:

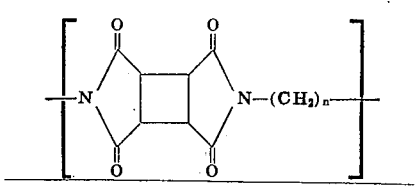

When the R-group is —CH$_2$—O—CH$_2$— only cyclopolymers are formed on exposure to light.

Suitable bis-maleimides are for instance:
dimethylene-bis-maleimide
trimethylene-bis-maleimide
tetramethylene-bis-maleimide
pentamethylene-bis-maleimide
hexamethylene-bis-maleimide
heptamethylene-bis-maleimide
decamethylene-bis-maleimide
m-phenylene-bis-maleimide
α, α'(bis-maleimide)-dimethyl ether
α, α(bis-maleimide)-dimethyl sulfide
α, α'(bis-maleimide)-dimethylamine
hexamethylene-bis(methylmaleimide)
hexamethylene-bis(dimethylmaleimide)
nonamethylene-bis(dichloromaleimide).

These bis-maleimides are prepared by adding a diluted solution of a diamine in ether to a diluted solution of maleic anhydride in ether, which addition occurs slowly to prevent polymerisation. The resulting product is a maleamic acid, which in acetic anhydride in the presence of potassium acetate is converted into the corresponding bis-maleimide. The bis-maleimides substituted by one or two methyl groups or chlorine atoms are obtained by allowing the correspondingly substituted maleic anhydrides and diamines to react in glacial acetic acid.

The photocyclomerization of bis-maleimides of the invention can be performed in solution. Therefore the bis-maleimides are dissolved in an organic solvent such as acetonitrile, methylene chloride, dioxan, and benzene. It is very interesting that, when using benzene as the solvent, a polymeric addition product is formed between benzene and the bis-maleimide upon exposure to ultraviolet radiation. When replacing benzene by a compound that comprises an aromatic nucleus attached to a polymeric chain, as in the case of polystyrene or copolymers of styrene, also photocross-linking of the polymer chains by the bis-maleimides takes place. Such a cross-linking reaction makes possible the use of these bis-maleimides in the preparation of photographic etching resists as will be explained hereinafter.

The photocyclomerization of bis-maleimides is carried out under the influence of ultraviolet radiation. The reactions can be activated by adding to the solution sensitizing agents such as carbonyl-containing aromatic compounds, e.g. benzophenone or Michler's ketone. The concentration of the bis-maleimides in the solvent may vary between wide limits. However, the best results are obtained with approximately 5×10$^{-2}$ mole of bis-maleimide per liter of solvent used. In this case the concentration of the sensitizing agent averages 5×10$^{-3}$ mole per liter.

Irradiation of the bis-maleimides may be carried out with a high-pressure mercury vapor lamp or any other light source emitting in the range of 3,000 to 4,000 A.

As mentioned above the bis-maleimides can be mixed with a polymer or copolymer comprising aromatic nuclei as substituents, e.g. polystyrene or copolymers of styrene. A solution of this mixture, to which a sensitizing agent e.g., benzophenone or Michler's ketone may be added, can be coated on a support, e.g. a zinc or copper plate or an aluminum foil. After evaporation of the solvent and exposure to a pattern of ultraviolet radiation, cross-linking of the polymer or copolymer occurs at the exposed areas, so that these areas become insoluble. The unexposed parts of the coating can be washed away with a solvent for the original polymer or copolymer, thus leaving a relief image of the radiation pattern applied. This resulting relief image can be used as a photographic printing plate or as a photographic etching resist if the metal support is to be etched by known means. In this way very interesting photographic printing plates and etching resists can be manufactured.

If the maleimide group is attached as a lateral substituent to a polymer, a very efficient photocross-linking of the polymer is induced upon ultraviolet irradiation.

It is also interesting to note that when the X and/or Y substituents in the general formula of the bis-maleimides represent chlorine atoms, nonburning, self-extinguishing cyclopolymers are obtained.

In the following examples exposure to ultraviolet radiation occurred in a Rayonet RS photochemical reactor of Southern New England Ultraviolet Company, Middletown, Conn., U.S.A. equipped with a RUL 3,500 A radiation source.

EXAMPLE 1

A diluted solution of hexamethylenediamine was added slowly, to avoid polymerization, to a diluted solution of maleic anhydride in ether. The product obtained was a maleamic acid, which in hot acetic anhydride (proportion by weight of maleamic acid and acetic anhydride 1:20) in the presence of 20 percent by weight of dry potassium acetate was converted into hexamethylene-bis-maleimide by heating to 90° C. Heating was continued for 5 minutes more and the mixture was then poured out on ice. The bis-maleimide precipitated and was recrystallized from acetonitrile or ethanol.

A solution of the resulting hexamethylene-bis-maleimide in acetonitrile ($10^{-2}$ mole/l.) was exposed for 210 minutes in a photochemical reactor as described above. The reaction product was obtained in an almost quantitative yield by evaporating the solvent in vacuo after the reaction. Finally, 95 percent of a cyclomer corresponding to the following structural formula was obtained after recrystallizing from acetonitrile:

[Structural formula of cyclomer with two maleimide groups connected through a cyclobutane ring, with N-(CH₂)₆-N bridge]

The same result was attained when adding $5\times10^{-3}$ mole of benzophenone as sensitizing agent to the solution.

If the exposure was carried out on a $5\times10^{-2}$ molar solution of hexamethylene-bis-maleimide with $5\times10^{-3}$ mole/l. of benzophenone in acetonitrile, a partial polymerization took place and 15 to 20 percent by weight of insoluble cyclopolymer could be collected afterwards.

EXAMPLE 2

Tetramethylene-bis-maleimide prepared analogously to the hexamethylene-bis-maleimide of example 1 was dissolved and exposed as described in example 1. One hundred percent of the collected product was a cyclomer.

EXAMPLE 3

Trimethylene-bis-maleimide was dissolved and exposed in the same conditions, as described in example 1.

One hundred percent of cyclomer melting at 355° C. was collected.

EXAMPLE 4

Dimethylene-bis-maleimide was dissolved in acetonitrile ($10^{-2}$ mole/l.) and in the presence of $5\times10^{-3}$ mole/l. of benzophenone exposed as described in example 1. A mixture of a cyclomer and a high-melting cyclopolymer was collected.

EXAMPLE 5

α,α'(Bis-maleimide)dimethyl ether was dissolved and exposed as described in example 1. During exposure a crystalline product deposited.

A cyclomer melting at 352° C. was collected.

EXAMPLE 6

A solution of m-phenylene-bis-maleimide in acetonitrile ($10^{-2}$ mole/l.) comprising $5\times10^{-3}$ mole/l. of benzophenone was exposed as described in example 1.

A mixture of an insoluble and a soluble cyclopolymer was collected. A polymer having a molecular weight of approximately 10,000 was collected from the soluble fraction (intrinsic viscosity in dimethyl sulfoxide : 0.2).

EXAMPLE 7

One hundred mg. of a copolymer of styrene and butadiene (85:15 mole percent), 20 mg. of hexamethylene-bis-maleimide and 2 mg. of Michler's ketone were dissolved in a mixture of 2 ml. of xylene and 3 ml. of methylene chloride.

A 50 μ thick layer was coated from this solution on an aluminum foil. The layer was dried at room temperature and subsequently exposed for 2 minutes to a test negative in a vacuum exposure unit with an ultraviolet lamp of 300 w. at a distance of 5 cm. The unexposed portions of the layer were then washed away with xylene. A clear hardened image, which could be used as a resist for etching of the support or could be applied to a negative offset printing method, was obtained.

EXAMPLE 8

A solution in acetonitrile of pentamethylene-bis-maleimide, prepared analogously to the hexamethylene-bis-maleimide in example 1 ($10^{-2}$ mole/l.) was exposed for 210 minutes as described in example 1. Eighty-five percent of a cyclomer melting at 349° C. was collected.

EXAMPLE 9

A solution in acetonitrile of heptamethylene-bis-maleimide prepared analogously to the hexamethylene-bis-maleimide in example 1 ($10^{-2}$ mole/l.) was exposed for 210 minutes as described in example 1. Eighty percent of a cyclomer melting at 269° C. was collected.

EXAMPLE 10

0.5 mole of methylmaleic anhydride was dissolved in 350 ml. of glacial acetic acid and a solution of 0.25 mole of hexamethylene-diamine in 175 ml. of glacial acetic acid was added thereto. The mixture was heated at reflux temperature and kept at that temperature for 3 hours. After cooling the precipitated product was isolated by filtration, washed with water, and dried. It was then recrystallized from ethanol. Before the exposure the resulting bis-maleimide was purified once again over a silicagel fluorisil column. The bis-maleimide corresponded to the following formula:

[Structural formula: $H_3C$-maleimide-$N-(CH_2)_6-N$-maleimide-$CH_3$]

A $5 \times 10^{-1}$ molar solution of the bis-maleimide in methylene chloride was exposed for 66 hours under nitrogen atmosphere to light with a wavelength of 310 nm. After the exposure the mixture was poured in hexane. The polymer formed was collected and dried. The cyclopolymer was composed of recurring units comprising a cyclobutane ring. The recurring units corresponded to the following structural formula:

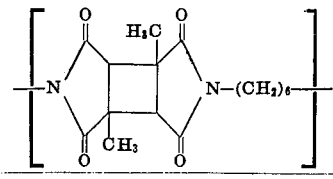

The molecular weight was approximately 3,650, which corresponds with a degree of polymerization of 12.

EXAMPLE 11

The process of example 10 was repeated with the difference, however, that methylmaleic anhydride was replaced by dimethylmaleic anhydride.

During photopolymerization there was formed a product, which was soluble in methylene chloride and which proved to be a cyclopolmyer with recurring units comprising a cyclobutane unit and corresponding to the structural formula:

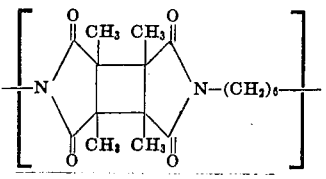

The molecular weight was approximately 3,300, which corresponds with a degree of polymerization of 10.

EXAMPLE 12

As in the first part of example 10 dichloromaleic anhydride and monomethylenediamine were made to react to form monomethylene-bis(dichloromaleimide) $2.7 \times 10^{-2}$ mole of benzophenone was added to a $10^{-7E^{-2}}$ molar solution of this bis-maleimide in methylene chloride. The resulting solution was then exposed for 100 hours in a glass reactor to light having a wavelength of 350 nm. The solvent was evaporated and the solids extracted for 30 hours with ether, whereupon the residue was dissolved in methylene chloride and precipitated in ether.

There was obtained a polymer having recurring units comprising a cyclobutane ring and corresponding to the following structural formula:

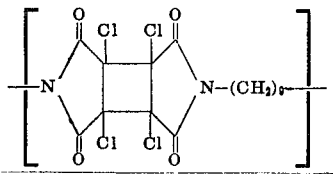

The cyclopolymer melted at 120°–121° C. and had a molecular weight of approximately 6,000, which corresponds with a degree of polymerization of 14.

We claim:

1. Process for the manufacture of a photographic printing plate or a photographic resist image, which comprises applying to a support a coating composition comprising a polymer of styrene and a bis-maleimide of the general formula:

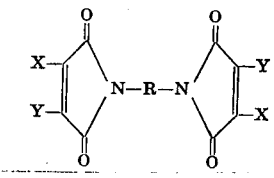

wherein:
R represents an alkylene group comprising one to 12 carbon atoms, a —$CH_2$—Z—$CH_2$— group or an arylene group, Z being O, S or NH, and X and Y represent hydrogen, chlorine, or methyl,
exposing said composition to a pattern of radiation in the range of 3,000 to 4,000 A, thereby cross-linking the polymer in the exposed portions, washing away the unexposed portions with a solvent for the polymer and leaving a negative printing plate or resist image of the pattern of radiation.

2. Process according to claim 1, wherein the bis-maleimide is dissolved in an organic solvent.

3. Process according to claim 1, wherein there is added to the bis-maleimide a sensitizing agent taken from the class consisting of benzophenone and Michler's ketone.

4. Process according to claim 1, wherein the bis-maleimide is hexamethylene-bis-maleimide.

5. Process according to claim 1, wherein the bis-maleimide is monomethylene-bis(dichloromaleimide).

6. A photographic element comprising a support having a coating comprising a polymer of styrene and a bis-maleimide of the general formula:

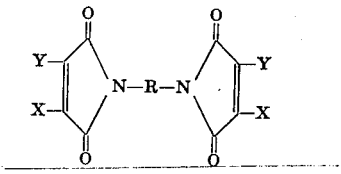

wherein:
R represents an alkylene group comprising one to 12 carbon atoms, a —$CH_2$—Z—$CH_2$— group or an arylene group, Z being O, S or NH, and X and Y represent hydrogen, chlorine, or methyl.

7. The photographic element of claim 6, wherein the bis-maleimide is hexamethylene-bis-maleimide.

8. The photographic element of claim 6 wherein the bis-maleimide is monomethylene-bis(dichloromaleimide).

* * * * *